O. CALL.
MOWING MACHINE.
APPLICATION FILED OCT. 4, 1913.
1,112,115.
Patented Sept. 29, 1914.
2 SHEETS—SHEET 2.
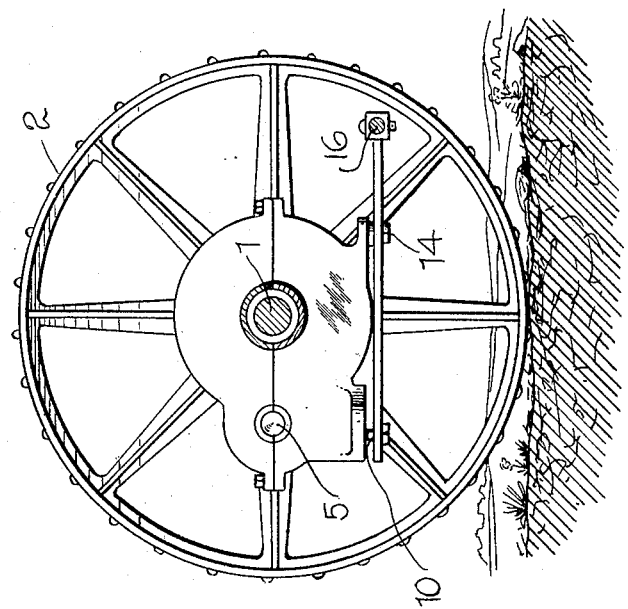
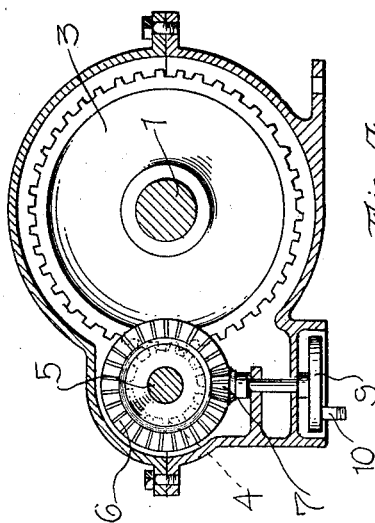
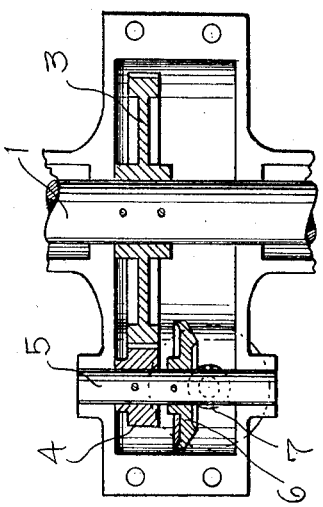
Inventor
OSMOND CALL
Witnesses

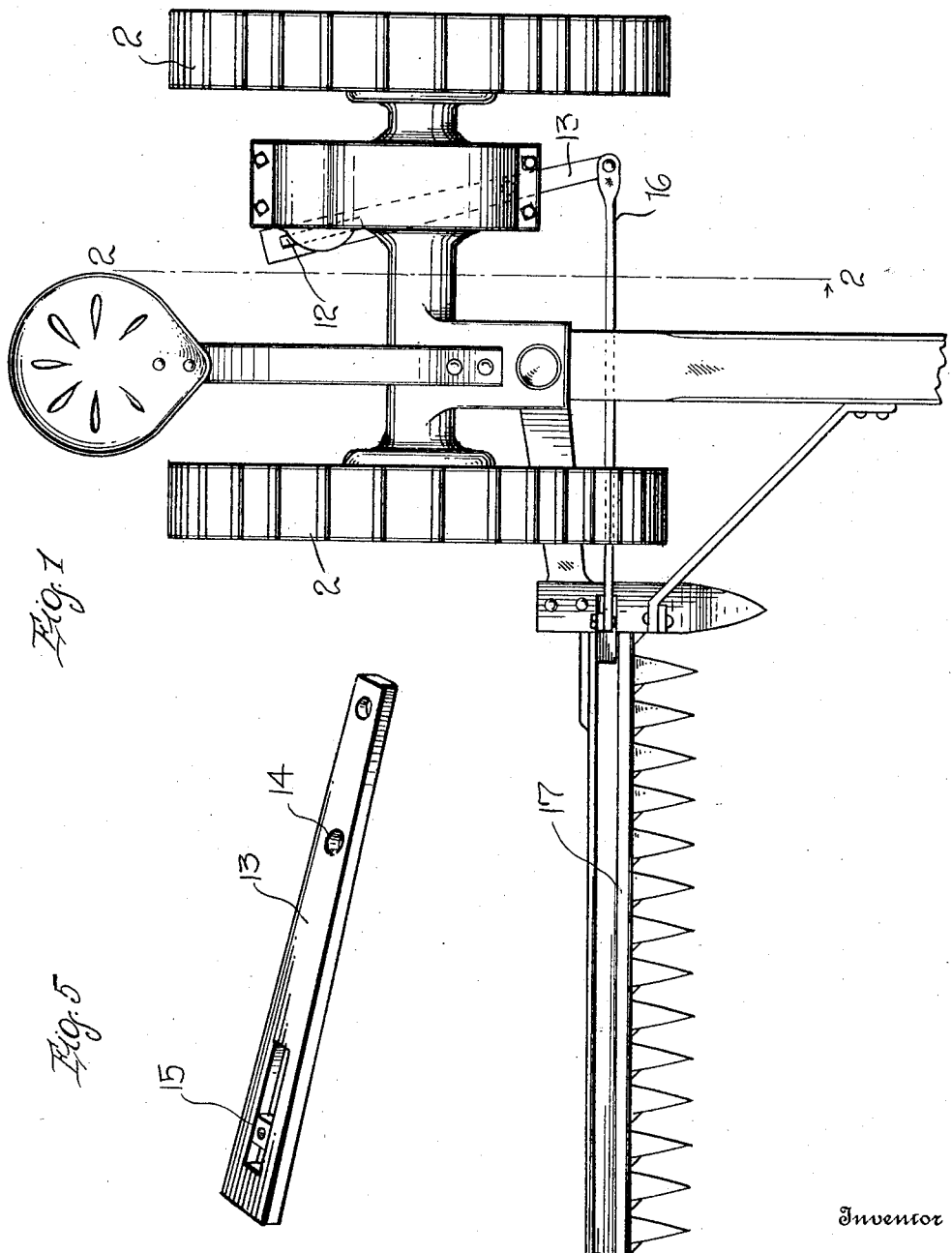

UNITED STATES PATENT OFFICE.

OSMOND CALL, OF CHESTERFIELD, IDAHO.

MOWING-MACHINE.

1,112,115. Specification of Letters Patent. Patented Sept. 29, 1914.

Application filed October 4, 1913. Serial No. 793,428.

*To all whom it may concern:*

Be it known that I, OSMOND CALL, a citizen of the United States, residing at Chesterfield, in the county of Bannock and State of Idaho, have invented certain new and useful Improvements in Mowing-Machines, of which the following is a specification, reference being had to the accompanying drawings.

This invention relates to new and useful improvements in mowing machines, the object of the invention being to provide new and improved means for connecting the pitman of a cutter bar with the main shaft, whereby all lost motion between the shaft and pitman will be eliminated, the connection therebetween being of such construction as to eliminate all necessity for changing the same at frequent intervals due to the wearing of the boxings, etc.

Another object of the invention is the provision of a device of the above character which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claim and shown in the accompanying drawings, in which—

Figure 1 is a top plan view of a mowing machine constructed in accordance with my invention; Fig. 2 is a longitudinal sectional view taken on the line 2—2 of Fig. 1; Fig. 3 is a longitudinal sectional view through the gearing chamber; Fig. 4 is a longitudinal sectional view; and Fig. 5 is a detail perspective view of the operating lever.

Referring more particularly to the drawings, 1 indicates the main shaft or axle upon the ends of which are mounted traction wheels 2. Mounted upon the shaft or axle 1 and arranged adjacent one of the wheels 2 is a gear 3, which is adapted to mesh with a similar gear 4, fixed to the shaft 5 which is arranged in parallel relation with the axle 1 and mounted upon the frame of the mower. A bevel gear 6 is also fixed to the shaft 5 in close proximity to the gear 4 and is adapted to mesh with a vertically disposed bevel gear 7, fixed to a vertical shaft 8, the lower end of which is mounted within a suitable bearing upon the frame of the mower. Fixed to the lower extremity of the shaft 8 is a disk 9 having depending therefrom adjacent its periphery the pin 10 adapted to project within the longitudinally disposed elongated slot 11 produced in one extremity of the lever 13. The lever 13 is pivoted adjacent one end upon the frame of the mower, as shown at 14, so that upon the rotation of the wheel 9, the lever will be given a rocking movement through the medium of the link or pin 10. Mounted upon the pin 10 is a suitable block 15 as shown in Fig. 5 which rotates upon the end of the pin and is movable within the slot so that the wear of the movement will be directly upon the boxing and not upon the lever or pin. From this it will be seen that should the block become worn, it can be quickly and readily removed and replaced by a new one, thus eliminating the necessity of changing the lever or pin.

The end of the lever opposite the slot 11 is pivotally connected to the pitman 16 of the cutter bar 17, so that upon the rocking movement of the lever the pitman 16 will be reciprocated and which in turn will reciprocate the cutter 17. In the accompanying illustrations, it will be noted that the pin or link 10 will move in a substantially six inch circle, thus giving a three inch movement to the cutting knife 17. It will also be apparent by the construction shown in the drawings, the pitman 16 is given a horizontal movement backward and forward instead of having one end pivotally secured to a crank and moved in a circular plane as is the general construction now in use. It will be seen that by this construction, more power is given to the cutting knife than where the pitman 16 moves in a circular and longitudinal plane.

From the above description taken in connection with the accompanying drawings, it will be apparent that I have provided a simple and durable means for operating the pitman of a cutting knife on mowers, binders, reapers and harvesters in a horizontal plane. It will also be apparent that with a slight change, this device may be readily and easily applied to mowing machines of the type in use at the present time. The device is also extremely simple in construction and can be manufactured at comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

A device of the character described comprising a supporting axle, traction wheels fixed thereto, a frame carried by the axle, a lever pivoted intermediate its length to the frame, a disk rotatable upon a vertical axis and provided with a pin loosely engageable with an extremity of the lever whereby said lever will be rocked upon rotation of the disk, an operative connection between the axle and the disk whereby said disk is rotated, a cutting mechanism including a reciprocating cutting bar, and a pitman connection between the opposite extremity of the lever and the reciprocating bar.

In testimony whereof I hereunto affix my signature in the presence of two witnesses.

OSMOND CALL.

Witnesses:
   Geo. H. Fisher,
   E. N. Ferguson.

---

Copies of this patent may be obtained for five cents each, by addressing the "Commissioner of Patents, Washington, D. C."